(12) United States Patent
Walz et al.

(10) Patent No.: US 12,129,926 B2
(45) Date of Patent: Oct. 29, 2024

(54) SEAL ASSEMBLY WITH SEAL UNIT

(71) Applicant: Trelleborg Sealing Solutions Germany Gmbh, Stuttgart (DE)

(72) Inventors: Alexander Walz, Stuttgart (DE); Jan Kolodziej, Fellbach (DE)

(73) Assignee: Trelleborg Sealing Solutions Germany GmbH, Stuttgart (DE)

( * ) Notice: Subject to any disclaimer, the term of this patent is extended or adjusted under 35 U.S.C. 154(b) by 50 days.

(21) Appl. No.: 17/938,645

(22) Filed: Oct. 6, 2022

(65) Prior Publication Data

US 2023/0036815 A1 Feb. 2, 2023

Related U.S. Application Data

(63) Continuation of application No. PCT/EP2021/059053, filed on Apr. 7, 2021.

(30) Foreign Application Priority Data

Apr. 7, 2020 (DE) ............... 10 2020 204 514.3

(51) Int. Cl.
*F16J 15/3204* (2016.01)

(52) U.S. Cl.
CPC ................ *F16J 15/3204* (2013.01)

(58) Field of Classification Search
CPC .... F16J 15/00; F16J 15/16; F16J 15/50; F16J 15/52; F16J 15/32; F16J 15/3204; F16J 15/3208; F16J 15/3216; F16J 15/322; F16J 15/3224; F16J 15/3232; F16J 15/3236

USPC .................................. 277/549, 555
See application file for complete search history.

(56) References Cited

U.S. PATENT DOCUMENTS

| | | | | |
|---|---|---|---|---|
| 4,376,541 A | * | 3/1983 | Walter | F16C 33/7896 277/568 |
| 4,426,091 A | * | 1/1984 | Baylor | F16J 15/3456 277/366 |
| 5,183,269 A | * | 2/1993 | Black | F16J 15/3256 277/420 |
| 5,269,536 A | * | 12/1993 | Matsushima | F16J 15/3256 277/573 |
| 6,042,272 A | * | 3/2000 | Nagase | F16C 33/7896 384/486 |
| 9,709,173 B2 | | 7/2017 | Kurth | |

(Continued)

FOREIGN PATENT DOCUMENTS

| | | |
|---|---|---|
| AT | 241928 B | 8/1965 |
| CH | 341038 A | 9/1959 |

(Continued)

*Primary Examiner* — Nathan Cumar
(74) *Attorney, Agent, or Firm* — Orbit IP, LLP

(57) ABSTRACT

A sealing arrangement includes a housing, a shaft and a sealing unit. The sealing unit includes a sealing ring having a retaining section and having a sealing lip which extends outwardly from the retaining section in a direction radial to the central axis of the sealing unit and which dynamically sealingly rests against a sealing surface of a housing of the sealing arrangement. The sealing unit includes an internally tensioning clamping ring which is arranged embedded in the material of the sealing ring and secures the axial position of the retaining section in the retaining groove and ensures that the retaining section is circumferentially pretensioned and statically sealingly rests against the shaft.

18 Claims, 6 Drawing Sheets

(56) References Cited

U.S. PATENT DOCUMENTS

| | | |
|---|---|---|
| 10,041,596 B2 | 8/2018 | Koch |
| 10,690,213 B2 | 6/2020 | Jordan |
| 11,131,384 B2 | 9/2021 | Jordan et al. |
| 11,686,389 B2 | 6/2023 | Wehmann et al. |
| 2003/0006113 A1* | 1/2003 | Terada .................... F16H 55/36 |
| | | 192/45.015 |
| 2003/0156772 A1* | 8/2003 | Yamashita .......... F16C 33/7896 |
| | | 384/486 |
| 2014/0353915 A1 | 12/2014 | Jordan |
| 2015/0192196 A1* | 7/2015 | Yamamoto ................ F16D 1/10 |
| | | 474/144 |

FOREIGN PATENT DOCUMENTS

| | | |
|---|---|---|
| CN | 102818030 A | 12/2012 |
| CN | 104214346 A | 12/2014 |
| CN | 104220795 A | 12/2014 |
| CN | 106795968 A | 5/2017 |
| CN | 110325771 A | 10/2019 |
| CN | 110678677 A | 1/2020 |
| DE | 1700 135 A1 | 12/1970 |
| DE | 25 54 840 A1 | 6/1976 |
| DE | 92 01 556 U1 | 4/1992 |
| DE | 10 2012 202 910 A1 | 8/2012 |
| EP | 0 789 152 A2 | 8/1997 |
| GB | 1215 221 A | 12/1970 |
| GB | 1 510 227 A | 5/1978 |
| JP | S61-82176 U | 5/1986 |
| JP | 2002-266881 A | 9/2002 |
| JP | 2008-281025 A | 11/2008 |
| JP | 2010-242874 A | 10/2010 |
| WO | 2017/051869 A1 | 3/2017 |

* cited by examiner

SEAL ASSEMBLY WITH SEAL UNIT

CROSS-REFERENCE TO RELATED APPLICATIONS

This continuation application claims priority to PCT/EP2021/059053 filed on Apr. 7, 2021 which has published as WO 2021/204871 A1 and also the German application number 10 2020 204 514.3 filed on Apr. 7, 2020, the entire contents of which are fully incorporated herein with these references.

DESCRIPTION

Field of the Invention

The invention relates to a sealing arrangement with a sealing unit.

Background of the Invention

In many areas of application, sealing arrangements with a simple sealing ring or a simple sealing washer are used in practice, which often provide only insufficient sealing effect. Such sealing arrangements are often found in bicycles, electric bicycles (=e-bikes), so-called pedelecs, power tools, agricultural equipment, but also in fittings in sanitary applications, food applications, refrigeration machines, steering systems and small gear units, etc.

The sealing units are arranged on the shaft and are supported with their radially outer edge area on the housing. A sufficiently large dynamic sealing contact pressure of the sealing units against the relevant sealing surface of the housing is often only given to a limited extent. In addition, the static sealing seat of the sealing unit on the shaft is often not very satisfactory. This makes it easier for contaminants such as water or dirt particles to penetrate the housing, where they can lead to functional impairments and increased wear of the bearing parts used to support the shaft.

It is therefore the task of the invention to specify a sealing arrangement with a sealing unit, which has an improved sealing capacity with a compact design and which is as easy as possible to assemble and disassemble.

SUMMARY OF THE INVENTION

The task relating to the invention is solved by a sealing arrangement comprising the features indicated in claim 1. Further embodiments of the invention are given in the dependent claims and in the description.

The sealing arrangement according to the invention is particularly suitable for a bicycle, an electric bicycle, electric tools, agricultural equipment, but also for fittings in sanitary applications, food applications, refrigerating machines, steering systems, small gear units and the like. The sealing arrangement comprises a housing and a shaft which is mounted in the housing such that it can be rotated about an axis of rotation. A sealing unit with a sealing ring and with a clamping ring arranged at least partially embedded in the elastically deformable material of the sealing ring serves to seal a sealing gap formed between the housing and the shaft with respect to the outside of the sealing arrangement. The sealing ring and the clamping ring thus form a construction or assembly unit that can be handled together. The sealing unit can be realized with a particularly compact construction depth. The sealing ring has a retaining section and a sealing lip which extends outwards from the retaining section in a radial direction and which rests in a dynamically sealing manner against a sealing surface of the housing in a direction axial to the axis of rotation. The clamping ring, which is internally tensioned in a radial direction, secures the axial position of the retaining section of the sealing ring in the retaining groove of the shaft and ensures that the retaining section is circumferentially pretensioned and statically sealingly rests against the shaft. The sealing unit can thus be secured against rotation on the shaft. The sealing unit thus permits reliable static as well as dynamic sealing of the sealing gap, so that undesirable ingress of water or contaminants into the sealing gap is counteracted more reliably than with the sealing units mentioned above. Even higher degrees of protection, for example against high-pressure/steam jet cleaning, can be achieved. Altogether, bearing parts of the shaft, for example the inner bearing of the pedal crankshaft of a bicycle/pedelec, can thus be reliably protected against excessive wear, malfunctions or even destruction due to contamination. Due to the clamping ring integrated at least in sections in the sealing ring, the sealing unit can furthermore be dismantled in a simplified manner and replaced for maintenance work or in case of wear. The axial fixing of the sealing ring in the retaining groove of the shaft also ensures sufficiently high contact pressure of the sealing lip on the housing and thus permanently effective dynamic sealing capability of the sealing unit.

According to a preferred further development of the invention, the clamping ring engages at least in sections in a radial direction in the retaining groove. In this way, the sealing ring or the entire sealing unit can be secured relative to the shaft, particularly reliably in a predetermined axial position (relative to its axis of rotation) and against moments acting on it.

According to a preferred embodiment of the invention, the clamping ring consists of a polymer material. This offers advantages in terms of manufacturing technology. In addition, it can counteract undesirable electrochemical corrosion in the area of the housing and provide the sealing unit with a particularly low mass. Alternatively, however, the clamping ring can also be made of metal, which can ensure a particularly high durability and load-bearing capacity of the clamping ring. In addition, standardized clamping rings can be used in the manufacture of the sealing unit if necessary, which offers cost advantages.

According to the invention, the sealing unit or the clamping ring has several tool engagements or tool engagement recesses. The tool engagements are preferably accessible from the outside of the sealing unit with a tool (in a non-destructive manner). The tool engagements preferably allow the clamping ring or the entire sealing unit to be expanded and thus permit simplified assembly or disassembly of the sealing unit.

According to one design, the tool engagements can be made at least partially in the form of (axial) through recesses of the clamping ring. In this design, the sealing ring preferably covers the tool engagements of the clamping ring on the outside in the axial direction in a sealing manner. For this purpose, according to a preferred further development of the invention, the sealing ring can have one or more closure elements detachably arranged on the rest of the sealing ring. Each closure element can extend through a respective one of the tool engagements and be arranged therein in a press fit and held in a sealing manner. This can enable particularly reliable self-securing of the respective closure element to the clamping ring. It is understood that each of the closure elements may also be secured, for example glued, to the rest of the sealing ring. Each closure element preferably consists of the same material as the rest of the sealing ring. Several of the closure elements or all of the closure elements can be manufactured in one piece. This offers manufacturing advantages and simplifies handling.

According to the invention, the clamping ring can have more than two tool engagements. According to a particularly preferred further development of the invention, a part of the tool engagements of the clamping ring is arranged in series in the circumferential direction of the clamping ring, preferably regularly spaced apart from one another. This enables particularly variable tool access on the clamping ring. The assembly/disassembly of the sealing unit can thus be further simplified. At least a part of the tool engagements can be adapted with respect to shape and/or size to the engagement of a defined blade profile of a tool, in particular a screwdriver.

According to a very particularly preferred further development of the invention, at least a part of the tool engagements of the clamping ring is in the form of a blind hole. This eliminates the need for these tool engagements to be sealed by the material of the sealing ring. As a result, the sealing device can be realized at very low cost and with a compact overall construction depth. In this case, the clamping ring does not require any sealing axial overlap by the material of the sealing ring.

According to one embodiment of the invention, the clamping ring can be slotted in the radial direction. The clamping ring is thus not completely closed in the circumferential direction. In this case, the clamping ring can have one of the tool engagements explained above, in particular in the form of a (so-called) eye, on each of its two free end sections. This is particularly advantageous in the case of a clamping ring made of metal.

According to a preferred further development of the invention, the retaining section of the sealing ring has on the inner circumferential side a circumferential sealing flange which engages in the retaining groove. Such a sealing flange can ensure a particularly reliable static sealing capability of the sealing unit on the shaft. The retaining flange can in turn provide a static seal in the radial and/or axial direction against the side flanks or the groove bottom of the retaining groove.

According to an alternative embodiment of the invention, the retaining section has, on the inner circumferential side, at least in some areas, a toothed edge section which engages in the retaining groove. This facilitates assembly and disassembly of the sealing unit, and the sealing ring can be realized with reduced material input. At the same time, the toothed edge portion can define pocket-like tool engagements. For sealing reasons, these tool engagements are preferably bounded in the axial direction by a circumferential (filigree) sealing collar or a sealing flange of the retaining section. The sealing collar/flange can form the rear side of the sealing unit, at least in sections. The sealing collar or sealing flange can lie against the inside groove flank of the retaining groove in an axially sealing manner.

According to a particularly preferred embodiment, the retaining section of the sealing ring is supported in a support zone outside the retaining groove on the outer surface of the shaft, preferably in a circumferential sealing manner. In other words, the retaining section extends outwardly from the retaining groove in a direction axial to the axis of rotation of the shaft and engages around the shaft in a contacting manner. On the one hand, this allows the retaining section to absorb larger moments without being excessively deformed or levered out of the retaining groove. Altogether, a particularly large dynamic contact pressure of the sealing lip on the housing can thus be realized with a small construction depth of the sealing unit. In addition, a further static sealing zone or static sealing plane can be realized between the sealing ring and the shaft outside the retaining groove. In general, this benefits the sealing function of the sealing unit.

If the aforementioned support zone of the retaining section of the sealing ring is offset outward in an axial direction with respect to the dynamic sealing plane of the sealing lip, the retaining section of the sealing ring can absorb particularly large moments.

Furthermore, according to the invention, the clamping ring can have first and second ring segments which are arranged alternately one behind the other in the circumferential direction of the clamping ring, the first ring segments, which are less elastically deformable than the second ring segments, being connected to one another via the second ring segments. This design is particularly advantageous in the case of a polymer spring ring. The second ring segments allow elastic expansion of the clamping ring, as required for assembly and, if necessary, also disassembly of the sealing unit.

The aforementioned tool engagements of the clamping ring can advantageously each be formed by one of the first ring segments.

The sealing ring is preferably molded onto the clamping ring according to the invention. This enables particularly cost-effective mass production of the sealing device. According to the invention, the clamping ring can in turn be designed in particular as an injection molded part, as a stamped part or also as a 3D printed part.

BRIEF DESCRIPTION OF THE DRAWINGS

Further advantages of the invention can be extracted from the description and the drawing. The invention is explained in more detail below with reference to embodiments shown in the drawing. The embodiments shown and described are not to be understood as an exhaustive enumeration, but rather have an exemplary character for describing the invention. In the drawing.

DETAILED DESCRIPTION OF THE PREFERRED EMBODIMENTS

Figure 1:
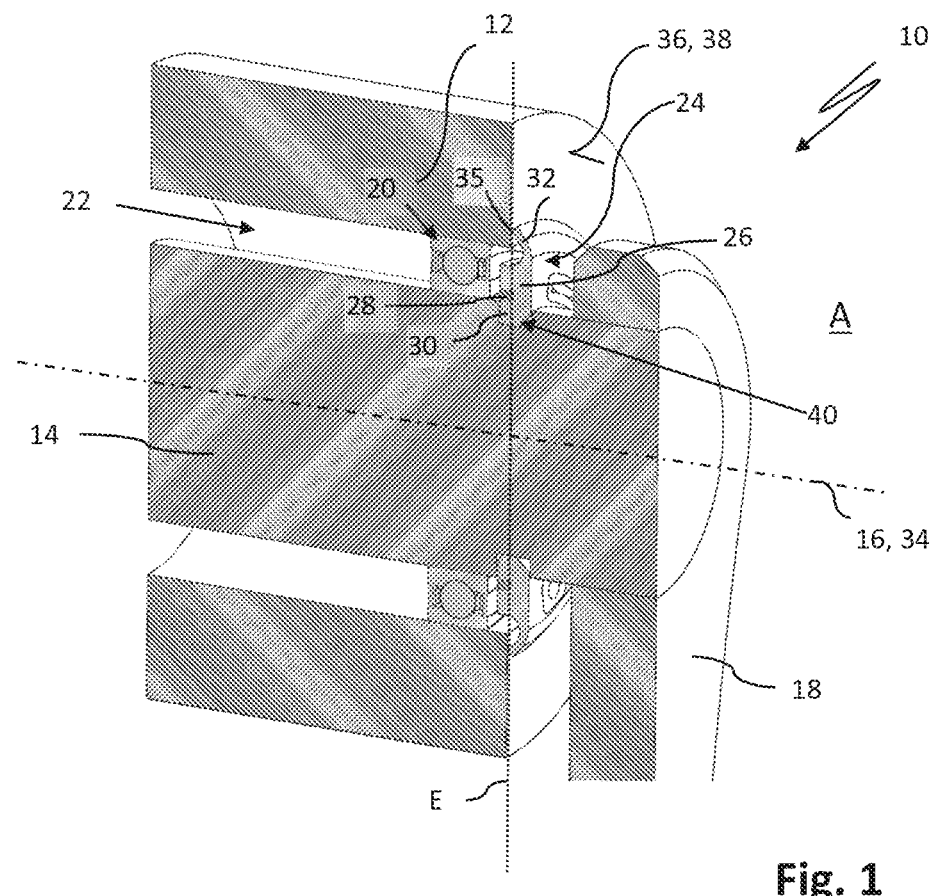
FIG. 1 shows a sealing device with a housing and with a shaft arranged rotatably therein, here exemplarily in the form of a pedal bearing sealing arrangement, with a pedal crank attached to the shaft, wherein a sealing unit serves to seal a bearing or sealing gap formed between the shaft and the housing, in a sectional cross-sectional view.

FIG. 1 shows a sealing arrangement 10, here purely exemplarily in the form of a pedal bearing sealing arrangement for a bicycle, a pedelec and the like. The sealing arrangement 10 comprises a housing 12 and a shaft 14 which here extends through the housing 12 and is rotatably mounted in the housing 12 about an axis of rotation 16. A pedal crank 18, which is known per se, can be attached to both ends of the shaft 14. At least two inner bearings 20, of which only one is shown in FIG. 1 for illustration reasons, are used here to support the shaft 14. The individual components of the inner bearings 20 can each be designed as an inseparable unit. The inner bearings 20 can also be designed as a so-called cartridge bearing in a manner known per se. A sealing unit, designated in total by 24, is used to seal a sealing gap 22 formed between the housing 12 and the shaft 14 with respect to the outer or dirty side A of the sealing arrangement 10. The sealing unit 24 comprises a sealing ring 26 and a clamping ring 28. The sealing ring 26 consists of an elastically, preferably rubber-elastically, deformable base material. An elastomer is particularly suitable as a base material. The sealing ring 26 has a retaining section 30 and a sealing lip 32, which extends outwardly from the retaining section 30 in a direction radial to the center axis 34 of the sealing ring 26 or the sealing unit 24. The sealing lip has a sealing edge 35. The center axis 34 of the sealing ring 26 coincides with the axis of rotation 16. Due to the inherent elasticity of its base material, the sealing lip 32 is in dynamic sealing contact with a sealing surface 36 of the housing 12 in the area of a dynamic sealing plane E in the axial direction. According to FIG. 1, the sealing surface 36 can be formed in particular by the end face 38 of the housing 12.

The clamping ring 28 serves to axially fix the retaining section 30 of the sealing ring 26 in a retaining groove 40 of the shaft 14 and ensures a radially preloaded and circumferentially statically sealing contact of the retaining section 30 of the sealing ring 26 against the shaft 14.

The elastically deformable base material of the sealing ring 26 can, for example, be molded onto the clamping ring 28.

Figure 2:
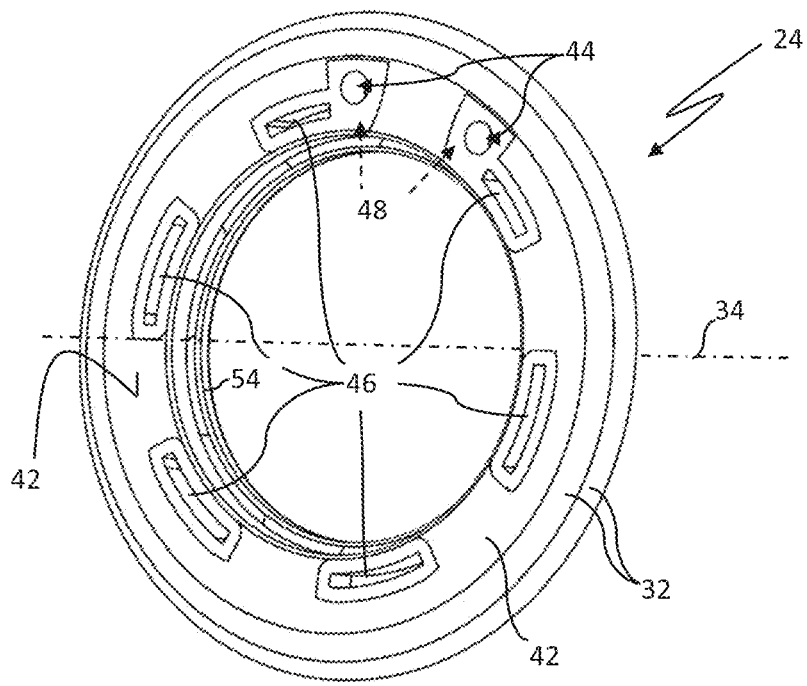
FIG. 2 shows a sealing unit similar to the sealing unit according to FIG. 1 in an isolated perspective view.
Figure 3:
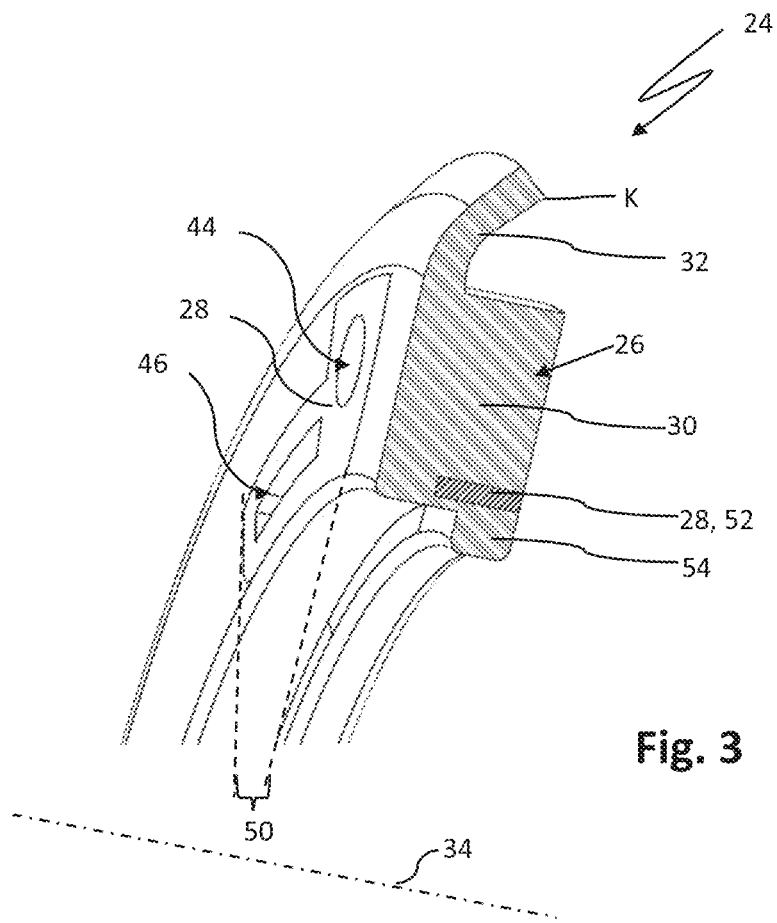
FIG. 3 shows the sealing unit according to FIG. 2 in a first sectional view.
Figure 4:
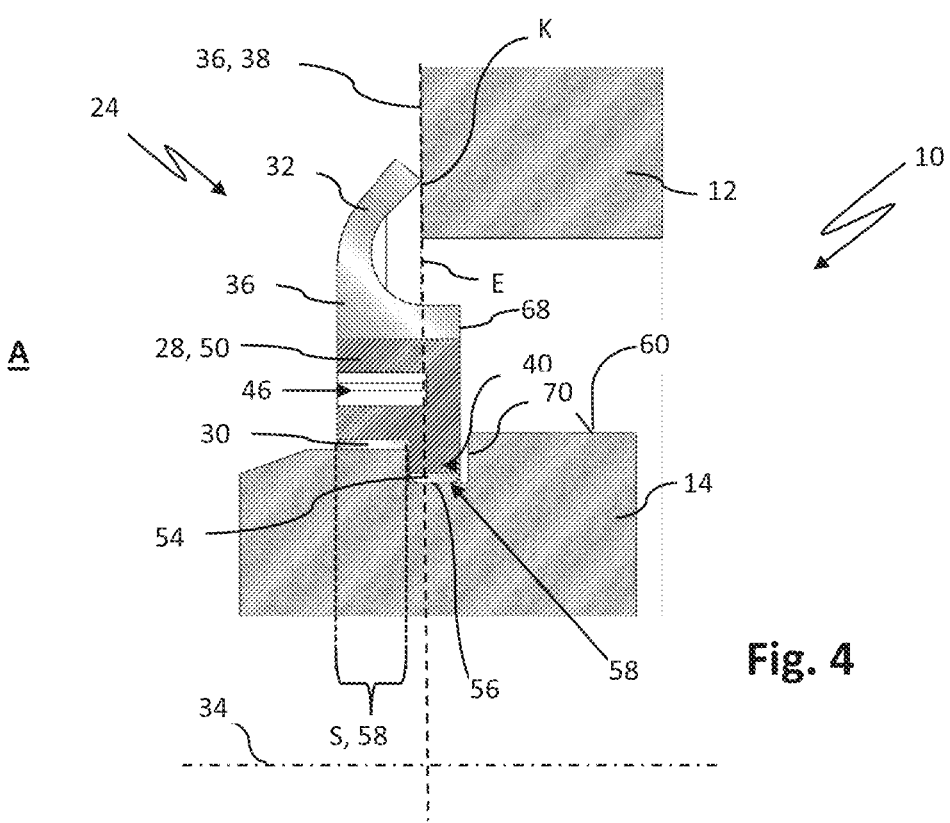
FIG. 4 shows a sealing arrangement with the sealing unit according to FIG. 2 in a sectional view.

FIGS. 2 to 4 show a sealing unit 24 which largely corresponds to the sealing unit 24 according to FIG. 1.

The sealing unit 24 has a plurality of tool engagements 44, 46 on its front side 42 facing the outside (A, cf. FIG. 1) in the assembled state. The tool engagements 44, 46 are each formed here by the clamping ring 28. The tool engagements 44, 46 are each designed here as blind hole recesses open towards the front side 42.

First tool engagements 44 serve to engage a clamping ring collet or the like, with the aid of which the clamping ring 28 can be expanded for assembly/disassembly of the sealing unit 24. Here, the clamping ring 28 is designed to be closed in the circumferential direction, but according to an alternative design, it can also be designed to be slotted in the radial direction. In this case, the clamping ring 28 has (in the circumferential direction) two free end portions 48 facing each other. The end sections 48 are then preferably provided with the first tool engagements 44.

Second tool engagements 46 are arranged in regularly spaced apart succession in the circumferential direction of the clamping ring 28. In particular, these second tool engagements 46 may have a rectangular opening cross-section and serve to engage a tool blade, for example a screwdriver (not shown). With the aid of these second tool engagements 46, the sealing unit 24 can be levered out of its mounting position in the retaining groove 40 (FIG. 1) without the need for a special tool—but possibly causing destruction.

According to FIGS. 3 and 4, the clamping ring 28 has first and second ring segments 50, 52, which are arranged alternately one behind the other in the circumferential direction of the clamping ring 28. Here, the first ring segments 50 each form one of the tool engagements 44, 46 and are less elastically deformable in the radial direction than the second ring segments 52, via which the first ring segments are flexibly connected to one another. As a result, assembly of the sealing unit 24 can be simplified by jointly expanding and axially sliding the sealing ring 26 and the clamping ring 28 onto the shaft (14, FIG. 1).

The clamping ring 28 is made of a material having a larger modulus, in this case a polymeric material, than the material of the sealing ring 26. The clamping ring 28 may be an injection molded part or a 3D printed part.

As shown in FIGS. 3 and 4, the retaining section of the sealing unit 24 shown in FIGS. 2 to 4 has an inner circumferential mounting and sealing flange 54 extending radially away from the remainder of the retaining section 30 in the direction of the central axis 34. The sealing flange 54 may have a rectangular cross-sectional shape and preferably a circular internal cross-section or a circular inner contour. In the assembled state of the sealing unit 24, the sealing flange 54 sealingly engages the retaining groove 40 (FIG. 4) over the entire circumference of the sealing ring 26. In this case, the sealing flange 54 is in static sealing contact in a radial direction with the groove bottom 56 of the retaining groove 40. As a result, a first static sealing zone 58 is formed between the shaft 14 and the sealing unit 24. It should be noted that the clamping ring 28 can only intermittently engage the retaining groove 40 in the circumferential direction, i.e. segment by segment, as can be seen from FIGS. 4 and 5. Particularly advantageously, the clamping ring 28 engages in the retaining groove 40 at least with its first ring segments 50.

According to FIG. 4, the sealing unit 24 extends away from the retaining groove 40 in an axial direction toward the outside A. The retaining section 30 is fully supported in a radial direction in a supporting zone S outside the retaining groove 40 on the outer surface 60 of the shaft 14. On the one hand, this allows sufficient contact pressure between the sealing lip 32 and the sealing surface 36 of the housing 12. In addition, when the retaining section 30 is in circumferential sealing contact with the shaft 14, a further static sealing zone 58 is formed between the shaft 14 and the sealing unit 24. The sealing ring 26 is thus in static sealing contact with the shaft 14 in the region of at least two axially spaced sealing zones 58.

According to FIG. 4, the sealing unit 24 can certainly be arranged with an axial clearance in the retaining groove 40, which facilitates the assembly of the sealing unit 24 and counteracts possible damage to the retaining section 30.

Figure 5:
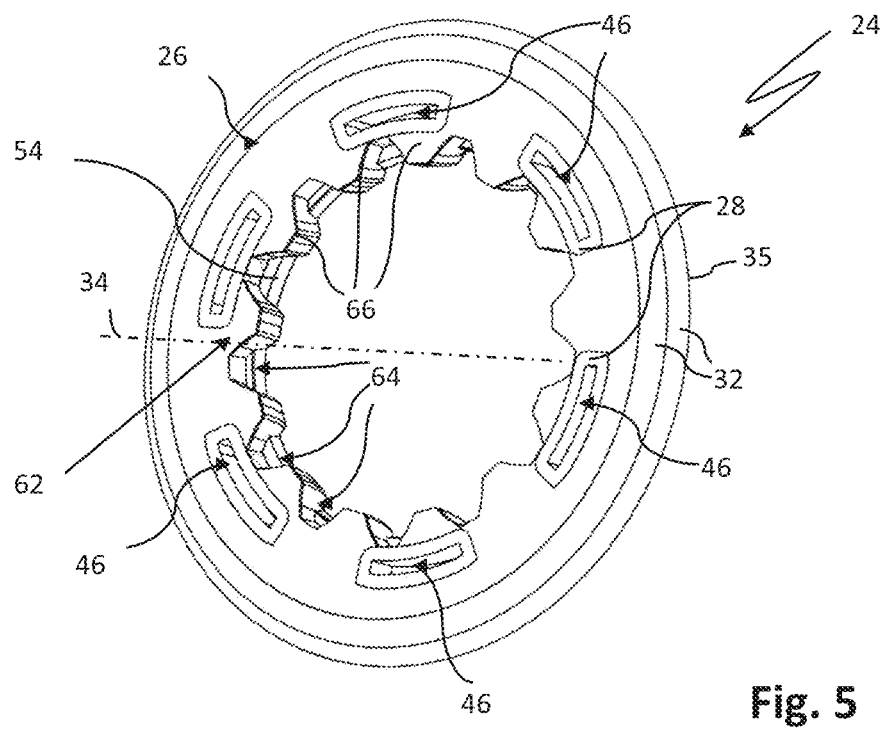
FIG. 5 shows another embodiment of the sealing unit, in a perspective view of the front side.

FIG. 5 shows a further sealing unit 24 which differs from the sealing units 24 explained above essentially in that the retaining section 30 of the sealing ring 26 has, on the inner circumference, a toothed edge section 62 with pocket-like third tool engagements 64. The third tool engagements 64 are lined up in a row spaced apart from one another in a circumferential direction, each being bounded on both sides by a tooth 66 of the edge portion 62. The teeth 66 project radially from the remainder of the retaining section 30 in a direction toward the central axis 34.

Figure 6:
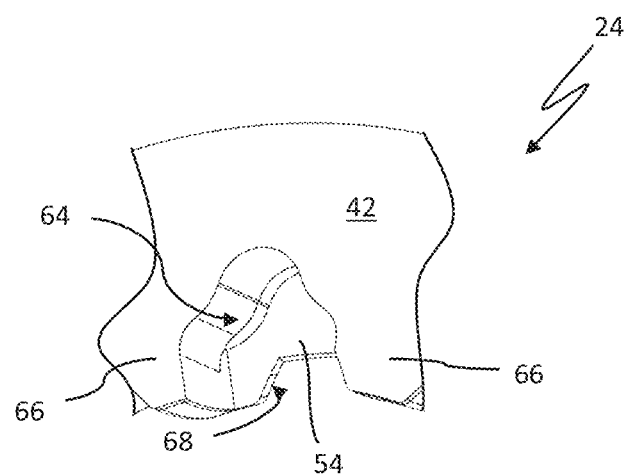
FIG. 6 shows a sealing unit similar to the sealing unit according to FIG. 5 in a detail section.

Referring to FIG. 6, the third tool engagements 64 may each be bounded axially in the direction of the rear side 68 of the sealing unit 24 by an inner circumferential sealing flange 54 of the sealing ring 26. In the installed state of the sealing unit 24, the retaining section 30 engages with its edge-side teeth 66 in the retaining groove 40 (FIGS. 1 and 4), while the static sealing effect of the retaining section 30 within the retaining groove 40 is achieved by the (filigree) sealing flange 54. The latter lies against the inner groove flank 70 of the retaining groove 40 in an axially circumferential sealing manner. The third tool engagements 64, which are arranged further centrally, permit even more effective widening of the sealing unit 24 for its assembly or further simplified levering out of the retaining groove 40 of the shaft 14.

Figure 7:
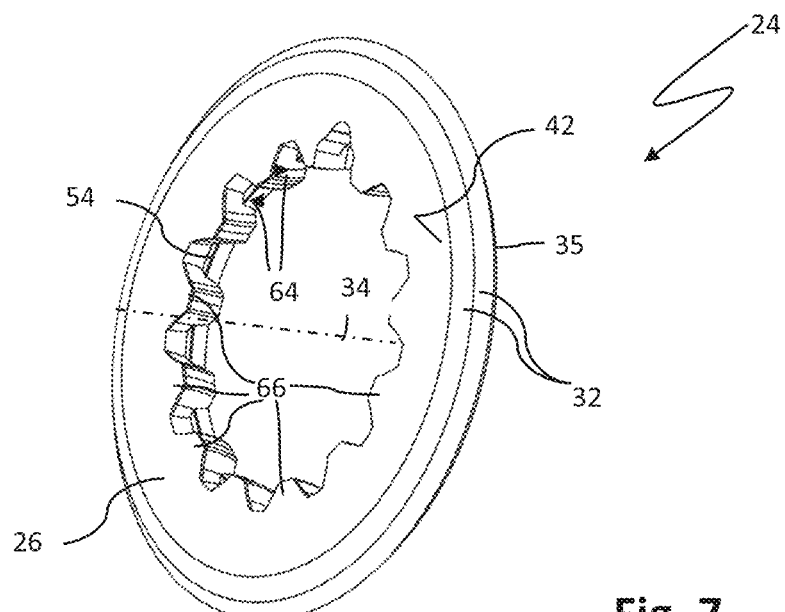
FIG. 7 shows a further embodiment of a sealing unit with a metallic clamping ring and with tool engagements at the edge, in a front perspective view.
Figure 8:
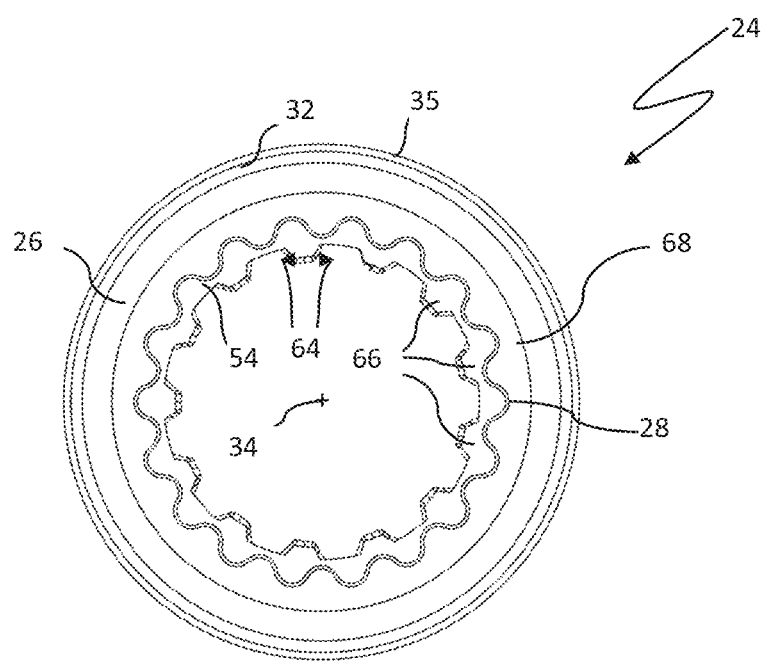
FIG. 8 shows the sealing unit according to FIG. 7 in a rear view.

The clamping ring 28 of the sealing unit 24 may also be made of metal according to the embodiment of the sealing unit 24 shown in FIGS. 7 and 8. In this case, the clamping ring 28 is exemplarily designed as an unslotted (=fully closed) shaft ring, which is arranged at least partially held embedded in the material of the sealing ring 26. The clamping ring 28 is completely covered on the front side (towards the outside A in the installed state) by the elastically deformable material of the sealing ring 26 in order to ensure reliable sealing capability of the sealing unit 24. The sealing unit 24 is provided here, only by way of example, with the pocket-like third tool engagements 64 explained above in connection with FIGS. 5 and 6. It should be noted that even with a metallic clamping ring, the sealing unit may have a plurality of the first or second tool engagements 44, 46 explained above in addition to or as an alternative to the third tool engagements 64.

Figure 9:
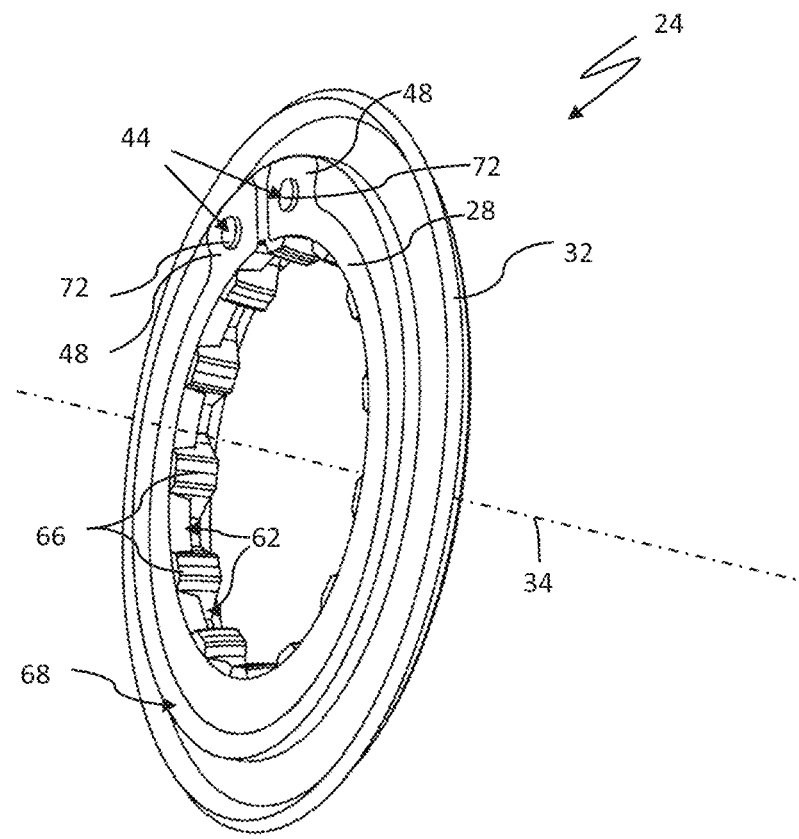
FIG. 9 shows a sealing unit with a clamping ring designed as a snap ring, in a rear view.
Figure 10:
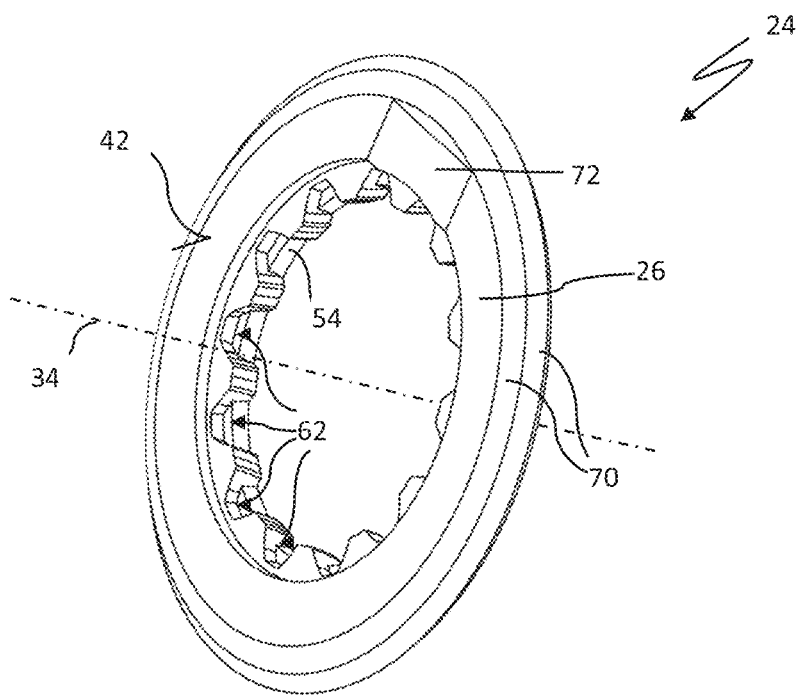
FIG. 10 shows the sealing unit according to FIG. 9 with a one-piece closure element for sealingly closing the tool engagements of the clamping ring, in a front view.
Figure 11:
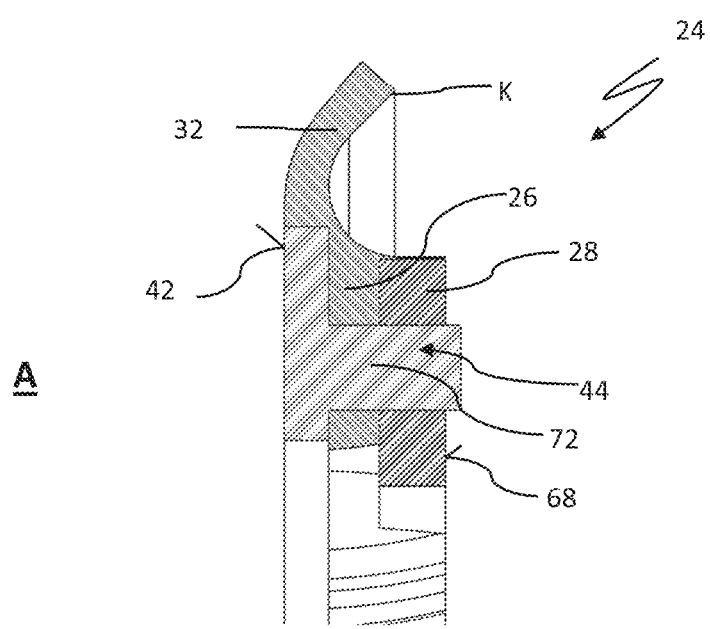
FIG. 11 shows the sealing unit according to FIG. 9 in a sectional view of the sectional plane designated A-A in FIG. 9.

According to the sealing unit 24 shown in FIGS. 9 to 11, the clamping ring 28 may alternatively also be in the form of a (slotted) snap ring made of metal, which is at least partially embedded in the material of the sealing ring. The two free end portions 48 of the clamping ring 28 are each formed with a first tool engagement 44, here in the form of an eye, for receiving a collet (not shown). The clamping ring 28 is arranged at the rear side 68 of the sealing unit 24. For sealing reasons, the clamping ring 28 is completely covered at the front in an axial direction by the material of the sealing ring 26. The sealing ring 26 may include one or more plugs or closure elements 72, each of which extends from the front side 42 of the sealing unit 24 into the two eyes of the clamping ring 28 and seals them in a fluid- and particle-tight manner. It is understood that the sealing ring has respective through recesses for the closure elements 72, which are not shown in greater detail in the drawing, and which are arranged in axial alignment with the first tool engagements 44. If necessary, the closure elements 72 may be bonded to the remainder of the sealing ring 26. Alternatively or additionally, each closure element 72 may be arranged to be retained in a press fit in the first tool engagements 44 of the clamping ring 28, as shown in the sectional view according to FIG. 11 along the sectional plane A-A shown in FIG. 9. The closure elements 72 may be integrally formed with each other.

The sealing ring 26 can have a circumferential sealing flange 54 at the retaining section 30 according to the embodiment shown in FIGS. 2 to 4 or also a toothed retaining section with a filigree sealing flange 54 (cf. FIGS. 7-10).

What is claimed is:

1. A sealing arrangement, comprising:
   a housing and a shaft which is mounted in the housing wherein it can be rotated about an axis of rotation; and
   a sealing unit configured for sealing a sealing gap formed between the housing and the shaft with respect to an outside of the housing;
   wherein the sealing unit comprises:
   a sealing ring having a retaining section and having a sealing lip which extends outwardly away from the retaining section in a radial direction and which dynamically sealingly rests against a sealing surface of the housing in an axial direction; and
   an internally tensioning clamping ring which is arranged embedded in the material of the sealing ring and secures the axial position of the retaining section in a retaining groove and which as well ensures that the retaining section is circumferentially pretensioned and statically sealingly rests against the shaft;
   wherein the retaining section of the sealing ring has on an inner circumferential side a circumferential sealing flange which engages in the retaining groove;
   wherein the clamping ring engages in the retaining groove at least in sections in a radial direction.

2. The sealing arrangement according to claim 1, wherein the clamping ring consists of a polymer material or of metal.

3. The sealing arrangement according to claim 1, wherein the clamping ring has a plurality of tool engagements which are accessible from the outside.

4. The sealing arrangement according to claim 3, wherein the clamping ring is slotted and has a respective tool engagement, in the form of an eye, at its free end portions.

5. The sealing arrangement according to claim 3, wherein at least a part of the tool engagements is arranged in series in the circumferential direction of the clamping ring, regularly spaced apart from one another.

6. The sealing arrangement according to claim 3, wherein at least a part of the tool engagements is designed in each case in the form of a blind hole open towards the outside.

7. The sealing arrangement according to claim 3, wherein at least a part of the tool engagements is designed as axial through recesses of the clamping ring, which are completely covered on the outside in an axial direction by the sealing ring wherein they are completely sealed.

8. The sealing arrangement according to claim 7, wherein the sealing ring comprises detachably arranged closure elements for sealing the tool engagements, which are glued or welded to the remaining sealing ring or are held in press fit on the sealing ring and/or on the clamping ring.

9. The sealing arrangement according to claim 8, wherein the closure elements are made of the same material as the remaining sealing ring and/or that the closure elements are formed together in one piece.

10. The sealing arrangement according to claim 3, wherein the retaining section of the sealing ring has a toothed edge section with a plurality of tool engagements, each of which is bounded in the circumferential direction on both sides by a tooth of the edge section.

11. The sealing arrangement according to claim 10, wherein at least a part of the tool engagements is delimited in an axial direction by a circumferential sealing flange of the retaining section, the sealing flange bearing in a sealing manner against an inner side groove flank of the retaining groove.

12. The sealing arrangement according to claim 3, wherein the clamping ring has first and second ring segments which are arranged alternately one behind the other in the circumferential direction, the first ring segments being less elastically deformable than the second ring segments, and the first ring segments being flexibly connected to one another via the second ring segments.

13. The sealing arrangement according to claim 12, wherein at least a part of the tool engagements of the clamping ring is formed by one of the first ring segments in each case.

14. The sealing arrangement according to claim 1, wherein the retaining section of the sealing ring is supported in a supporting zone outside the retaining groove in a radial direction, in a circumferentially sealing manner, against the outer surface of the shaft.

15. The sealing arrangement according to claim 14, wherein the supporting zone is arranged offset outwardly in an axial direction relative to a dynamic sealing plane of the sealing lip or the dynamic sealing plane intersects the supporting zone.

16. The sealing arrangement according to claim 1, wherein the clamping ring has first and second ring segments which are arranged alternately one behind the other in the circumferential direction, the first ring segments being less elastically deformable than the second ring segments, and the first ring segments being flexibly connected to one another via the second ring segments.

17. A sealing arrangement, comprising:
  a housing and a shaft which is mounted in the housing wherein it can be rotated about an axis of rotation; and
  a sealing unit configured for sealing a sealing gap formed between the housing and the shaft with respect to an outside of the housing;
  wherein the sealing unit comprises:
    a sealing ring having a retaining section and having a sealing lip which extends outwardly away from the retaining section in a radial direction and which dynamically sealingly rests against a sealing surface of the housing in an axial direction; and
    an internally tensioning clamping ring which is arranged embedded in the material of the sealing ring and secures the axial position of the retaining section in a retaining groove and which as well ensures that the retaining section is circumferentially pretensioned and statically sealingly rests against the shaft;
  wherein the retaining section of the sealing ring has on an inner circumferential side a circumferential sealing flange which engages in the retaining groove;
  wherein the clamping ring has a plurality of tool engagements which are accessible from the outside.

18. A sealing arrangement, comprising:
a housing and a shaft which is mounted in the housing wherein it can be rotated about an axis of rotation; and
a sealing unit configured for sealing a sealing gap formed between the housing and the shaft with respect to an outside of the housing;
wherein the sealing unit comprises:
  a sealing ring having a retaining section and having a sealing lip which extends outwardly away from the retaining section in a radial direction and which dynamically sealingly rests against a sealing surface of the housing in an axial direction; and
  an internally tensioning clamping ring which is arranged embedded in the material of the sealing ring and secures the axial position of the retaining section in a retaining groove and which as well ensures that the retaining section is circumferentially pretensioned and statically sealingly rests against the shaft;
  wherein the retaining section of the sealing ring has on an inner circumferential side a circumferential sealing flange which engages in the retaining groove;
  wherein the clamping ring has first and second ring segments which are arranged alternately one behind the other in a circumferential direction, the first ring segments being less elastically deformable than the second ring segments, and the first ring segments being flexibly connected to one another via the second ring segments.

\* \* \* \* \*